B. C. STICKNEY.
COMBINED TYPE WRITING AND COMPUTING MACHINE.
APPLICATION FILED JUNE 16, 1914.

1,293,234.

Patented Feb. 4, 1919
9 SHEETS—SHEET 1.

WITNESSES:

INVENTOR:
Burnham C Stickney

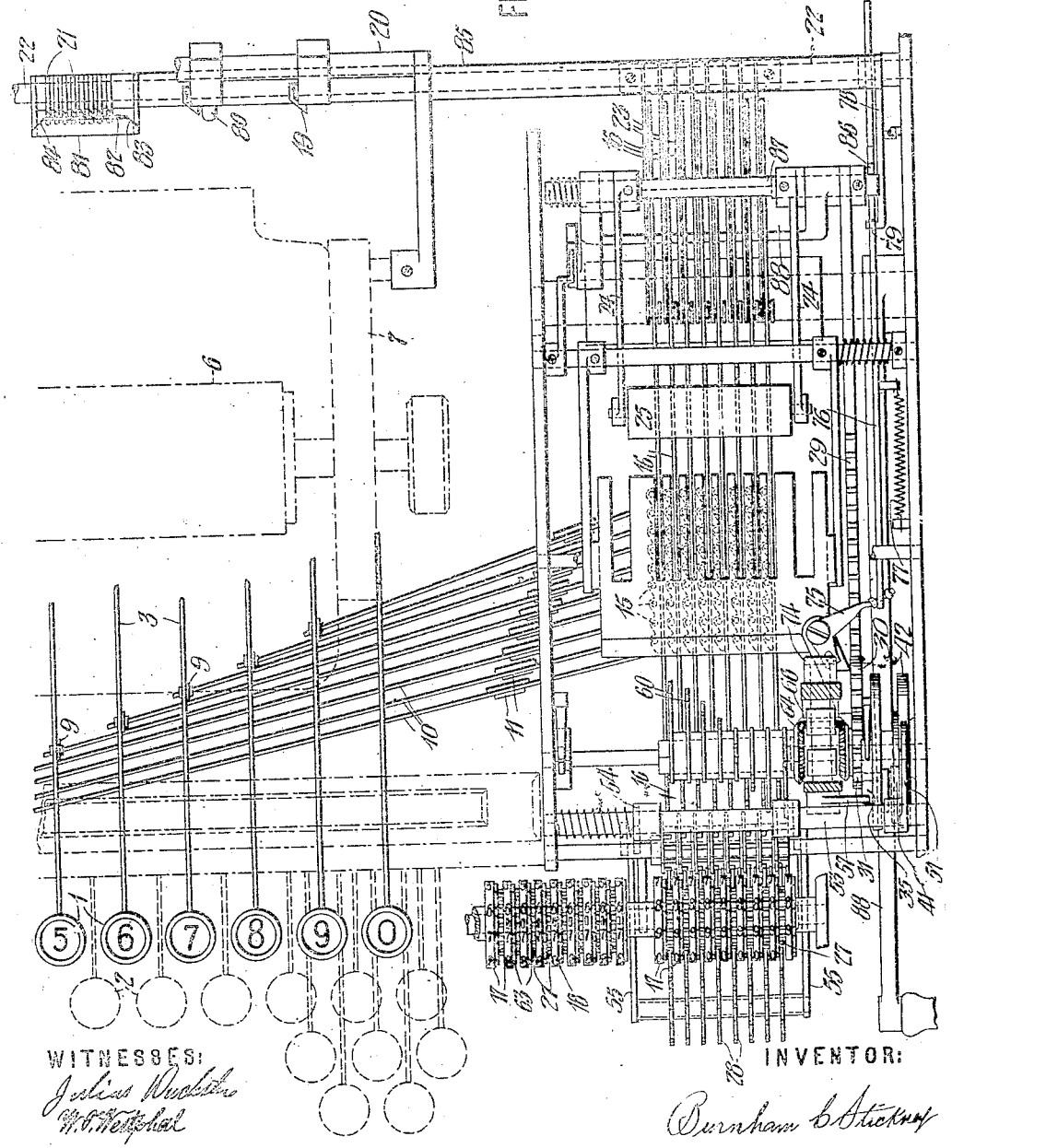

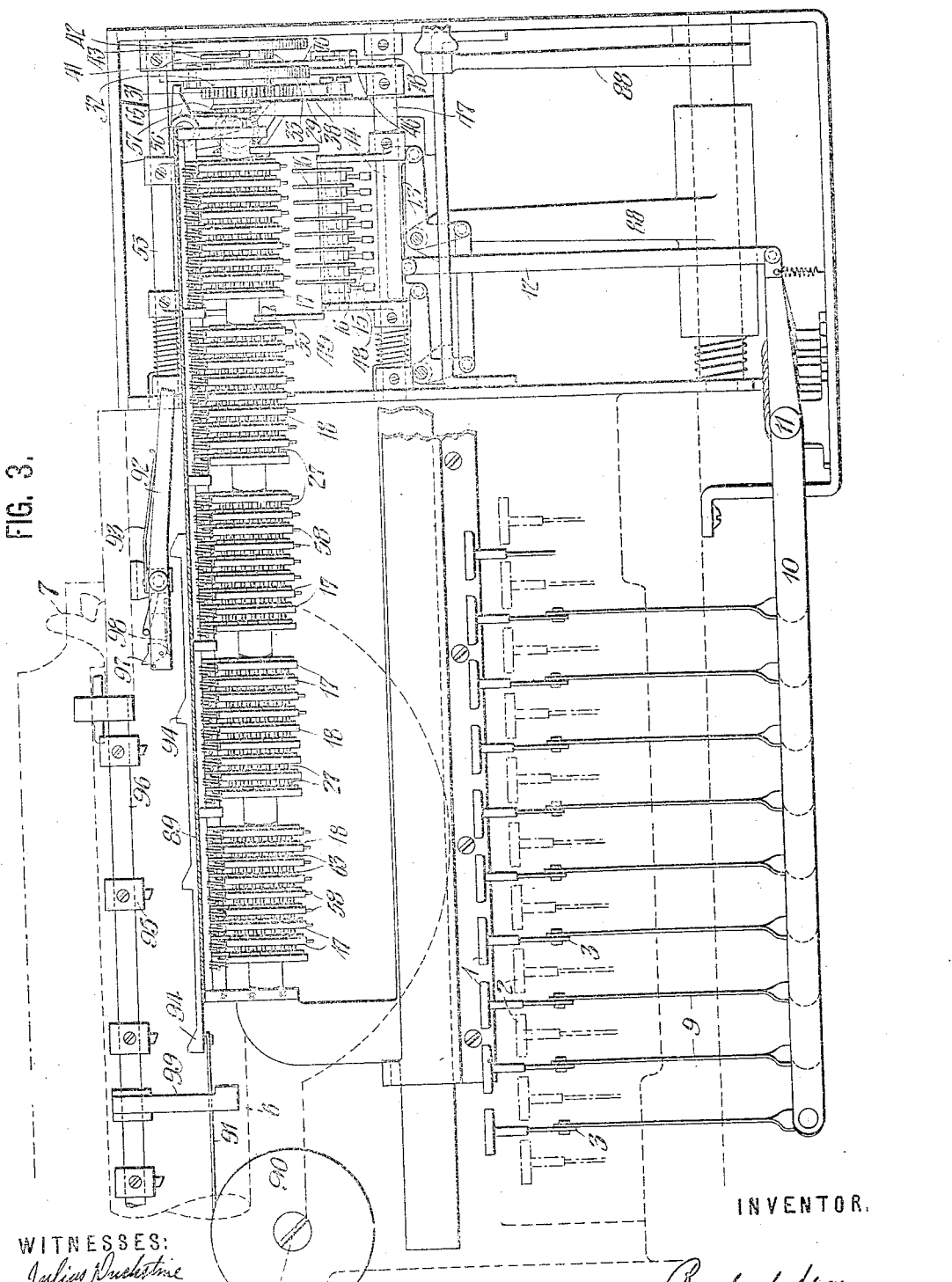

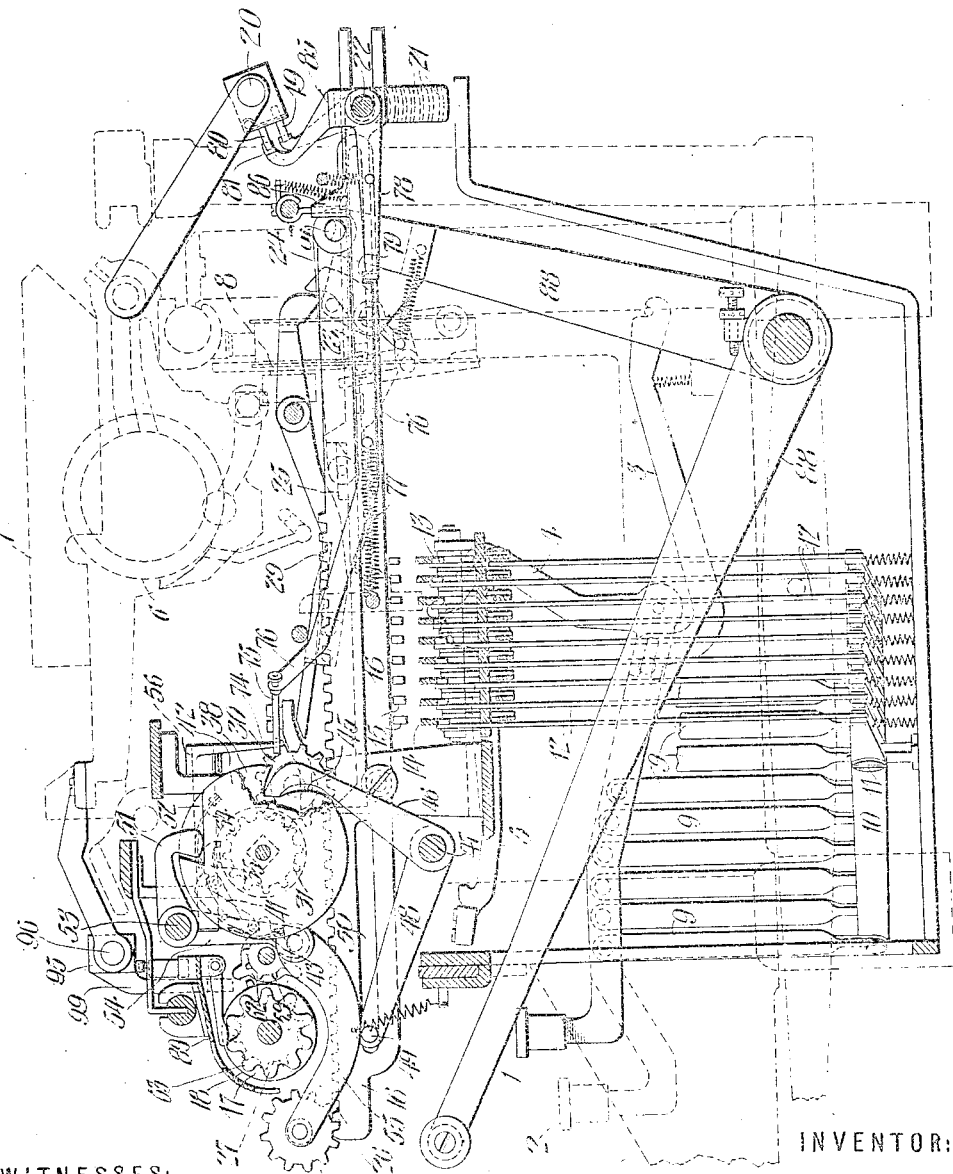

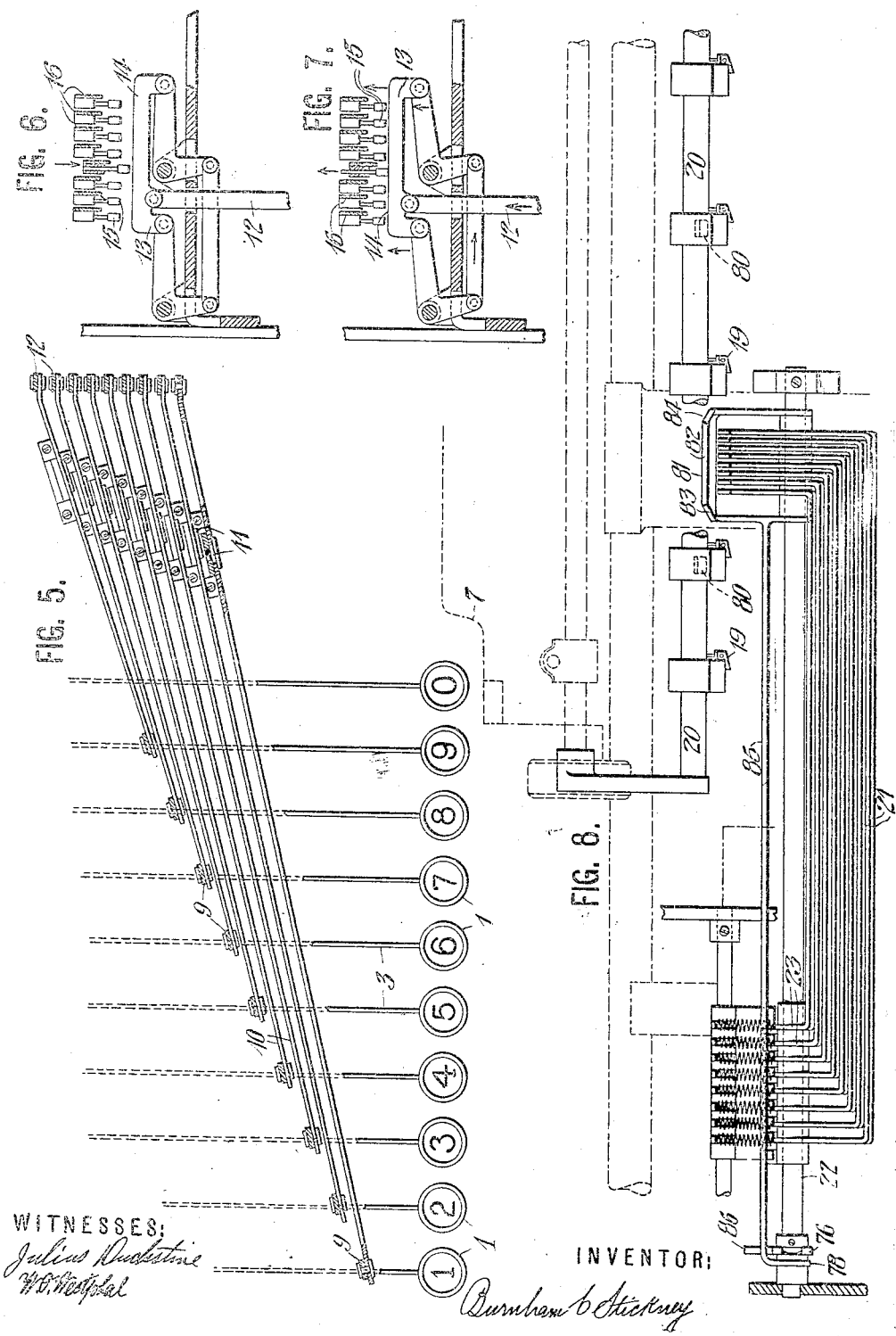

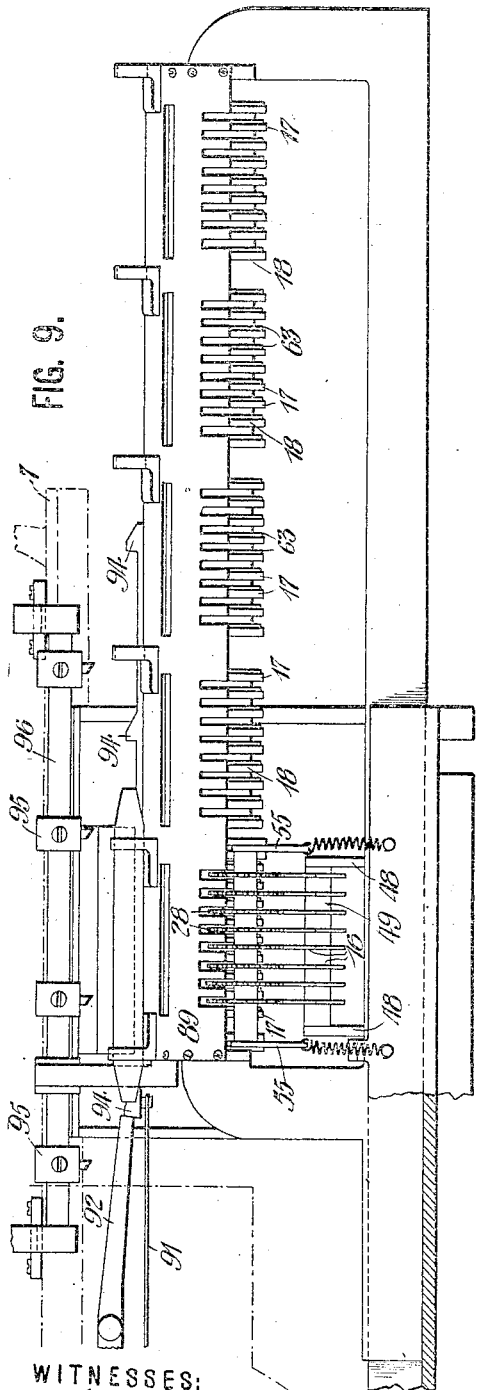
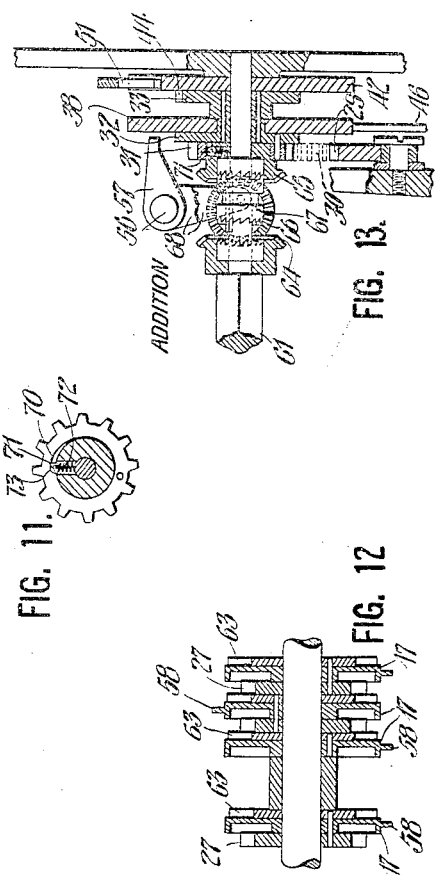
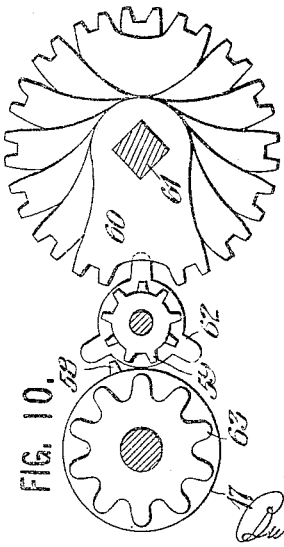
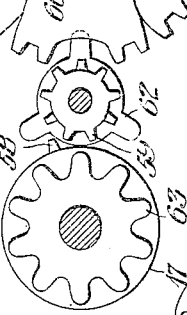

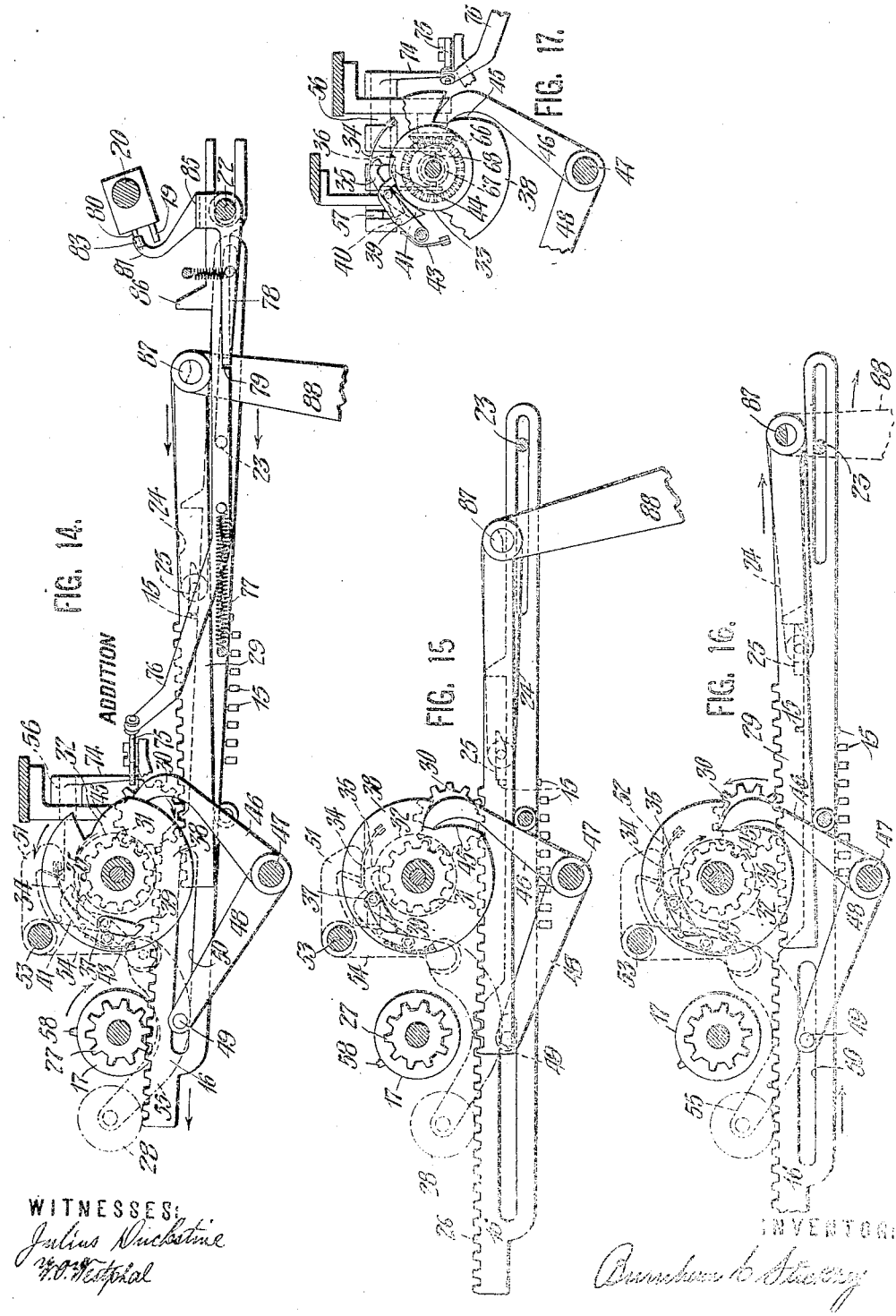

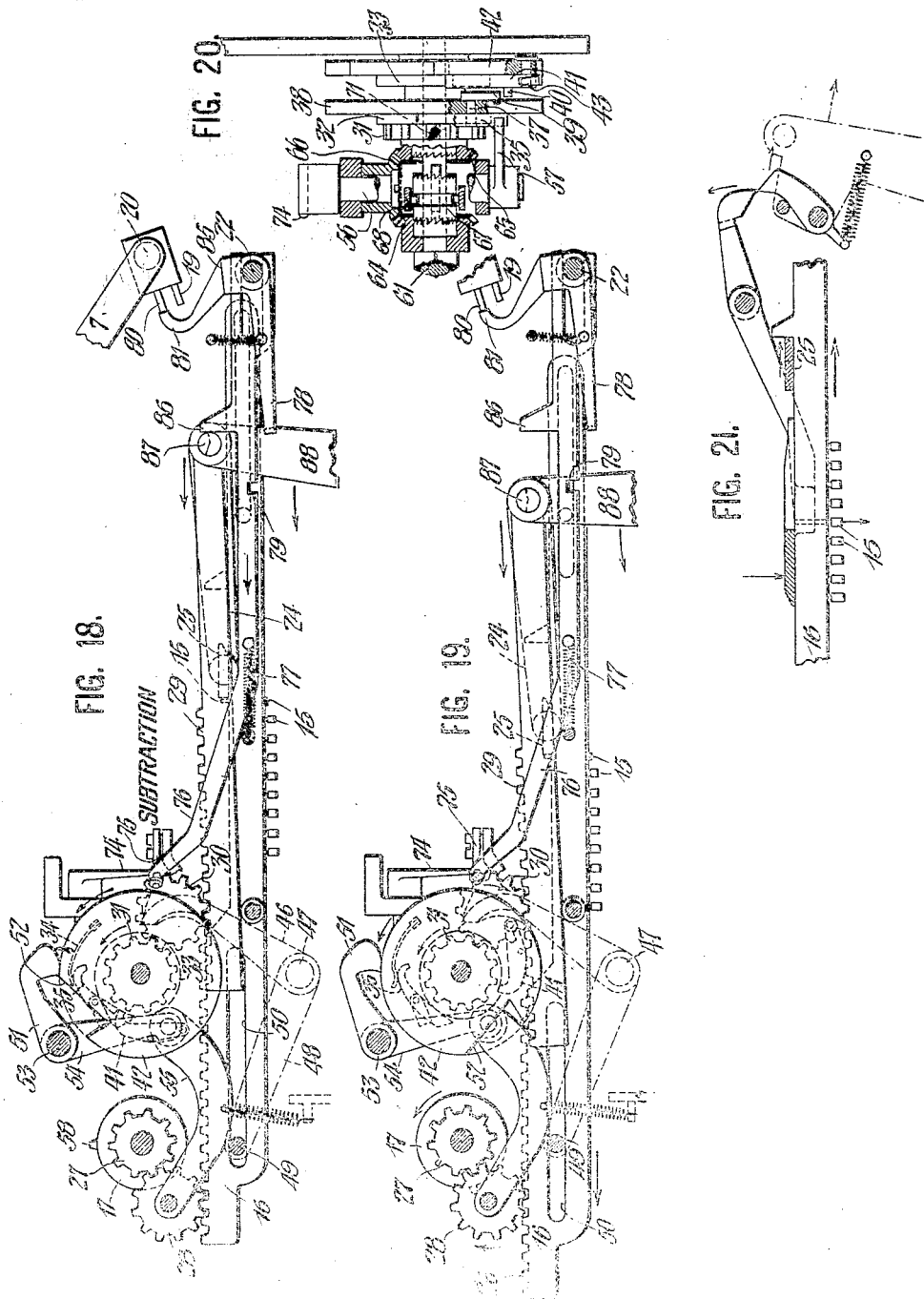

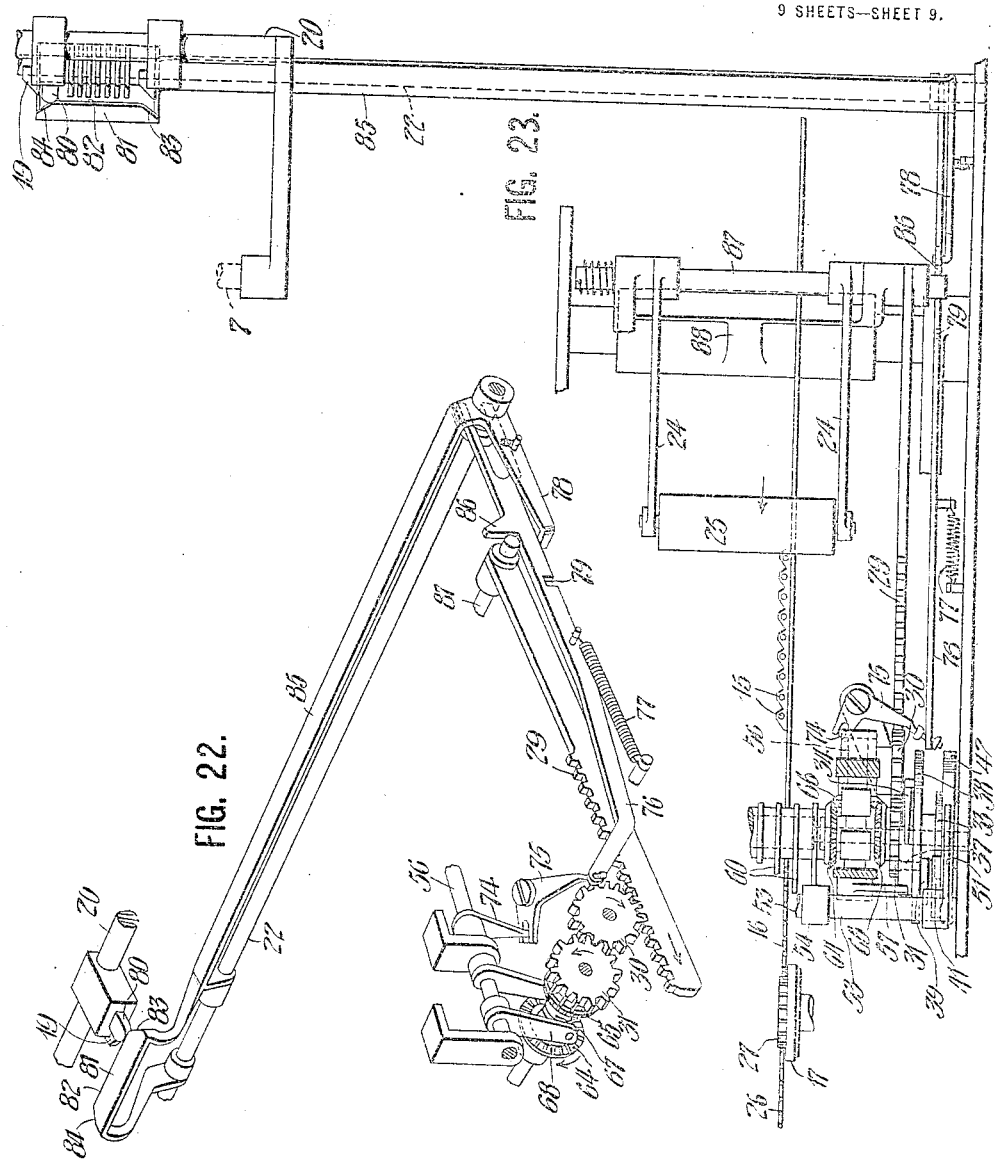

UNITED STATES PATENT OFFICE.

BURNHAM C. STICKNEY, OF ELIZABETH, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,293,234.

Specification of Letters Patent.

Patented Feb. 4, 1919.

Application filed June 16, 1914. Serial No. 845,244.

*To all whom it may concern:*

Be it known that I, BURNHAM C. STICKNEY, a citizen of the United States, residing in Elizabeth, in the county of Union and State of New Jersey, have invented certain new and useful Improvements in Combined Type-Writing and Computing Machines, of which the following is a specification.

This invention relates to a combined typewriting and computing machine of a type adapted to effect cross additions and subtractions, and in which the setting for addition and subtraction is effected automatically to correspond with predetermined addition and subtraction zones, and is an improvement on the construction disclosed in my Patent No. 1,186,520, issued June 6, 1916.

In my patent above mentioned, the numbers were set up or indexed digit by digit as written by the typewriting mechanism, in a preliminary registering or representing mechanism, and then all of the digits after having been indexed were run up simultaneously into a computing head or totalizer. Several of these computing heads or totalizers were provided, which could be jumped into register with the actuating mechanism controlled from the preliminary representing mechanism, so as to receive numbers for different computing zones. These numbers could be run in one direction or the other in each totalizer, for either addition or subtraction, by directly actuating the computing wheels of the totalizers, or indirectly actuating them through an intermediate set of gears. The shift for addition and subtraction, however, was performed manually.

In the present invention, the computing action takes place in the same manner as in my above-mentioned patent, with the exception that the manner in which the computation would be run into each totalizer, that is, whether for addition or subtraction, is controlled automatically, and from the typewriter carriage which travels to determine the different digit columns and the different computing zones or columns.

The mechanism is set normally for addition, and will operate to run up numbers in an adding manner except when in a subtraction computing zone or column. Then a tappet carried by the carriage will come into engagement with a trip having a range corresponding to the computing zone and connected to release a latch, which normally restrains a subtraction-setting mechanism from operation. The latch on being tripped no longer locks the subtraction-setting mechanism in its ineffective position, but this latter is still held by the general operator for the computing mechanism until it acts, when it will permit the subtraction-setting mechanism to come into play. The subtraction-setting mechanism enables an intermediate set of idle pinions to interpose themselves between the computing wheels of the particular totalizer or computing head in action and the actuating racks therefor, so that the computing wheels will be rotated for subtraction.

After the subtraction operation has taken place, the mechanism will be automatically reset for addition, and will remain in such condition for the next computing zone or column, unless there is another subtracting tappet for that computing zone or column predetermining a subtracting operation.

Other features and advantages will hereinafter appear.

In the accompanying drawings—

Fig. 2 is a top plan view of the right-hand end of the machine, with parts broken away to show the underlying structure.

Fig. 3 is a detail front view of the right-hand end of the machine, with parts omitted for the sake of simplicity.

Fig. 4 is a vertical section from front to rear, showing the parts in their inactive positions.

Fig. 5 is a detail horizontal section, showing the connection of the numeral keys to the levers which they actuate to set the pins.

Fig. 6 is a detail view, showing one of the denominational bars depressed to a position to have the pins thereon set.

Fig. 7 is a view similar to Fig. 6, showing one of the pin-setting linkages having been actuated to set a pin on the depressed denominational bar.

Fig. 8 is a rear view in elevation, showing the transposition mechanism for actuating the denominational members to bring them into the sphere of action of the pin-setting mechanism, and also showing the subtraction-setting trip bar.

Fig. 9 is a detail front view in elevation of the mechanism for jumping the series of totalizers from one computing zone to another, to bring into play each totalizer or computing head separately.

Fig. 10 is a detail view of the double-acting tens-carrying mechanism, which operates either for addition or subtraction.

Fig. 11 is a section through the clutch, which controls the connection of the tens-carrying mechanism to the general operator to be driven thereby solely during the return movement of the general operator.

Fig. 12 is a section through the adjacent portions of two computing heads, showing how they are spaced apart from each other.

Figure 1:
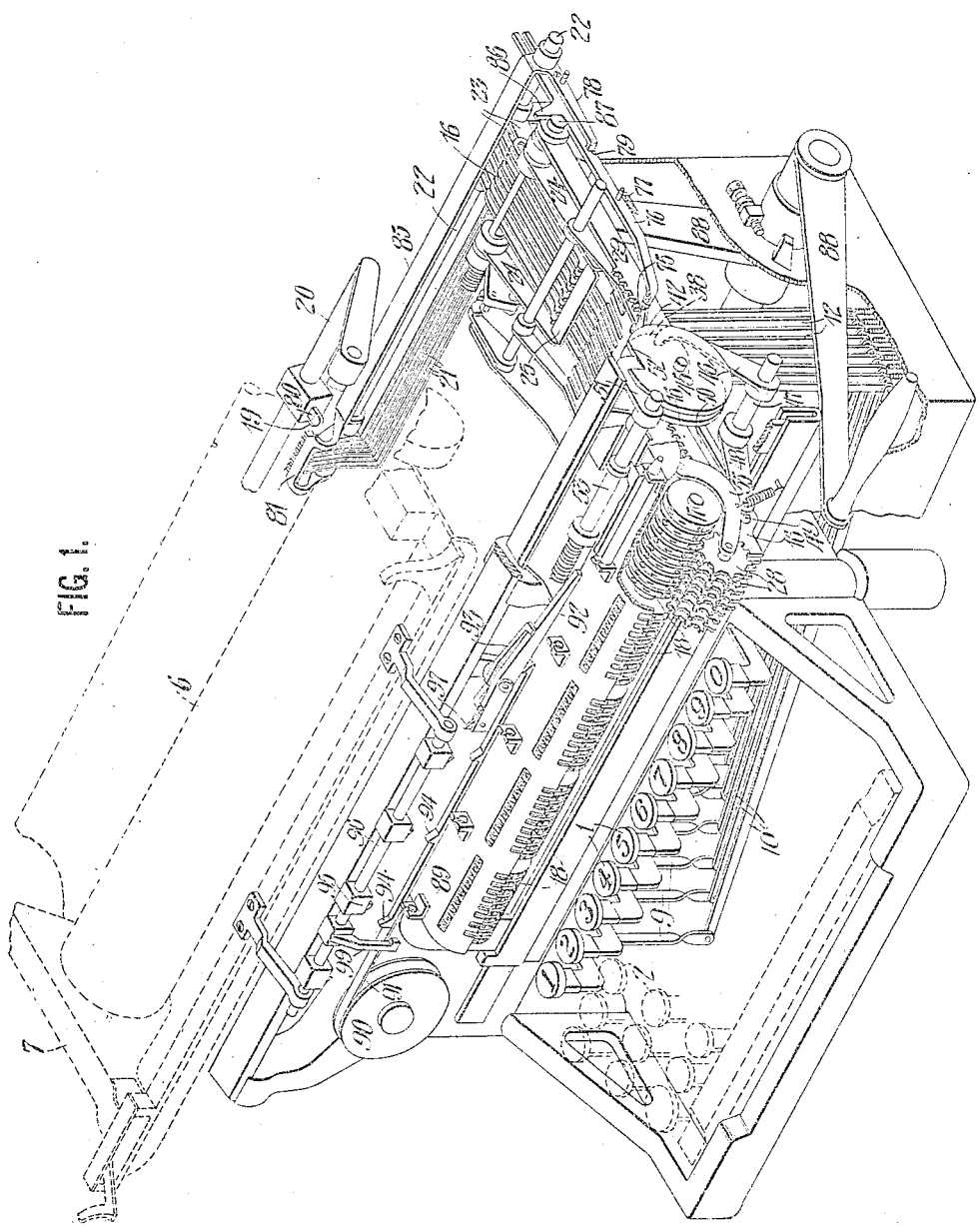
Figure 1 is a vertical perspective view, with parts omitted for the sake of simplicity.

Fig. 13 is a vertical section taken from right to left through the clutching mechanism for rotating the tens-carrying assisting shaft in one direction or the other for addition or subtraction, and also showing the mechanism for shifting the racks in the case of addition, and the floating pinions in the case of subtraction, into engagement with the computing wheels, the parts being shown in a condition to perform an adding operation.

Fig. 14 is a vertical section taken from front to rear, showing the mechanism shifted during an adding operation, with the actuating racks in mesh with the gears on the computing wheels.

Fig. 15 is a view of the parts shown in Fig. 14, with the exception that the forward stroke of the general operator has been completed, and the actuating racks moved out of engagement with the computing wheels for a return idle movement.

Fig. 16 illustrates the idle return movement of the actuating racks from the position shown in Fig. 15, and also illustrates the active return movement of the general operator rack for a tens-carrying operation.

Fig. 17 is a detail vertical section taken from front to rear, showing the mechanism set for subtraction, with the pawl which connects the adding cam thrown out of operation, permitting the clutching pawl for the subtracting cam to come into operation.

Fig. 18 is a view similar to Figs. 14 to 16, corresponding, however, to the adjustment of the parts in Fig. 17 for a subtracting operation, and illustrating the general operator as having moved forward far enough to bring the floating idle pinions into mesh with the gears of the computing wheels. This view also shows how the latch for the subtraction-setting mechanism is tripped by the tappet carried by the carriage.

Fig. 19 is a view similar to Fig. 18, showing, however, a slightly advanced stage of the movement during the forward stroke of the general operator.

Fig. 20 is a view similar to Fig. 13, with the exception that the clutch is shifted for subtraction, so that the tens-carrying assisting shaft will be rotated for a subtracting carrying, and showing the pawl which clutches the adding cam thrown out of action, so that the clutching pawl of the subtracting cam is in action.

Fig. 21 is a detail view, showing the pin-restoring mechanism in the act of restoring pins which have been set for the just completed computation.

Fig. 22 is a skeleton perspective view showing how the subtraction tappet carried by the carriage trips the latch for the subtraction-setting mechanism, enabling the latter, when the general operator moves forward, to shift for subtraction. The parts are shown after the subtraction tappet has tripped the latch, and after the general operator has moved partially forward to effect the subtraction setting.

Fig. 23 is a fragmentary top plan view, showing the parts in the condition illustrated in Fig. 22.

Numeral keys 1 and alphabet keys 2 depress key-levers 3 (Fig. 4), to rock bell cranks 4, to swing type-bars 5 up rearwardly against the front side of a platen 6, mounted to rotate on a carriage 7, which travels step by step at the striking of each key, under the control of an escapement mechanism indicated in general at 8, and in a manner common to Underwood typewriters.

The numeral keys 1, in addition to operating type actions, also effect a computing operation. To do this, each numeral key depresses a thrust link 9 (Fig. 1) connected to rock one of a series of levers 10 (Figs. 3 and 5), which are pivoted intermediate their ends, as at 11, and force up at their rear ends, thrust links 12. Each of these thrust links is connected to a pin-setting linkage 13, so as to operate the same at the actuation of the corresponding numeral key, and raise the upper reach 14 thereof to engage one of a transverse row of pins 15, corresponding in value to the numeral key actuated. There is a row of pins 15 of the same value corresponding to each of the numeral keys, and these pins are also arranged in intersecting rows of values from "1" to "9", on denominational members 16. The pins, when set, determine the extent of movement of the denominational members 16, which are also actuating members, and drive in a manner to be described, computing wheels 17 of totalizers 18.

The pins 15, however, are normally located beyond the sphere of operation of the pin-setting linkages 13. To bring each row of pins, valued from "1" to "9", successively within the range of the pin-setting linkages 13, there is provided a denomination-selecting mechanism, which includes a series of denomination-controlling tappets 19 carried by the carriage, there being one for each computing zone or column desired.

In the present instance, the tappets 19 are shown as adjustably mounted along a bail 20, which is secured in any suitable manner to the carriage 7. Each tappet 19, as it comes into a computing zone or column, is arranged to engage and operate *seriatim*, a series of transposition levers 21, which are pivoted on a rod 22. By rocking one end of each lever 21, the opposite end is rocked to swing down an arm 23 thereof, which has a pin-and-slot connection with the corresponding one of the denominational bars 16.

It will be noted in passing that the order of engagement of a tappet 19 with the transposition levers 21, is the reverse of the order of engagement of the arms 23 with the denominational bars 16. This is to enable the tappet 19, which proceeds from right to left with the travel of the carriage, to effect a selection from left to right of the denominational members in order to correspond with the computation which proceeds from left to right.

It will be seen that each of the denominational bars 16 is depressed in order to bring the row of pins 15 thereon within the sphere of operation of the pin-setting linkages 13, so that a cross-selection will be effected to set a pin corresponding to the particular key actuated, and corresponding to the particular denominational or digit column being printed and computed in.

The pins when projected up above their fellows and above the denominational bars 16, determine the extent of movement of these bars on a subsequent actuation of a general operator 24. That is to say, the pins project into the path of a cross bar 25 carried by the general operator, and move variable distances to carry with them their racks, so as to drive the computing wheels 17 variable amounts.

To effect the driving of the computing wheels, the denominational members 16 are provided with racks 26, which may be brought up into direct mesh with gears 27 provided on the computing wheels 17. With a direct mesh of the racks 26 with the gears 27, an adding operation is performed. If a subtracting operation is desired, intermediate floating and idle gears may be brought in between the racks 26 and the gears 27, so as to rotate the computing wheels 17 in the opposite direction.

Normally, both the racks 26 and the gears 28 are out of mesh with the gears 27. There is provided, however, means to alternatively bring either the racks 26 into direct mesh with the gears 27, or the pinions 28 into mesh with the gears 27, at the initial forward movement of the general operator 24, before the cross bar 25 has come into engagement with one of the pins 15, and thus before any of the denominational rack bars 16 have started forward.

To do this, the general operator 24 is provided with a rack 29 (Fig. 18), which drives a pinion 30 meshing to drive a gear 31. The gear 31 (Figs. 13 and 20) has secured for rotation therewith, an adding clutch disk 32, and a subtracting clutch disk 33. Normally, a spring 34 (Fig. 17) holds a clutch pawl 35 in a position to be engaged by a notch or shoulder 36 on the adding clutch disk 32. The pawl 35 is pivotally mounted by means of a pin 37 (Fig. 20), on an adding cam 38, and is arranged to clutch the adding cam 38 to the adding disk 32, so as to rotate with the gear 31. The pin 37 has secured thereto, on the opposite side of the cam 38 from which the clutch pawl 35 is located, an arm 39, which underlies a pin 40, on a clutch pawl 41 pivoted to a subtraction cam disk 42. A spring 43 normally tends to urge the clutch pawl 41 into engagement with a notch or shoulder 44 on the subtracting clutch disk 33, but is restrained from so doing by the arm 39, which engages the pin 40, the spring 34 for the adding clutch pawl 35 being stronger than the spring 43 for the subtracting clutch pawl. It has thus been shown how the adding cam disk 38 is normally clutched in driven relation with the gear 31, while the subtracting cam disk 42 is normally unclutched, that is, with respect to the gear 31.

During an adding operation, on the initial portion of the forward stroke of the general operator, the rack 29 rotates, through the gear 30, the gear 31, thus rotating the cam disk 38, so as to cause the latter, by its cam surface 45, to force an arm 46 out on to the periphery of the cam disk 38. The arm 46 is secured to the rock shaft 47, which also has secured thereto a pair of arms 48, carrying a cross bar 49, which extends through a series of alined slots 50 in the denominational bars 16 just below the racks 26 thereon. It will thus be seen that during the initial portion of the forward stroke of the general operator, the cam 38, by rocking the arms 46 and 48, forces the racks 26 up into mesh with the gears 27, so that by the time the cross bar 25 comes into engagement with any of the set pins 15, the racks 26 will be capable of driving the gears 27, and thus the computing wheels 17, for an adding operation.

If instead of an adding operation, a subtracting operation is desired, the adding clutch pawl 35 will be rendered silent by being lifted out of engagement with the shoulder 36, thereby permitting the spring 43 to act to shift the subtracting clutch pawl 41 into engagement with the notch 44 in the subtracting clutch disk 33, so that the subtraction cam 42 will be connected in driven relation with the gear 31 during a movement of the general operator 24. Under such conditions, the adding cam will be silent, while an arm 51 will be forced by a cam surface 52 out on to the periphery of the subtraction cam 42, so as to rock a shaft 53, to which the arm 51 is secured.

Also secured on the rock shaft 53, to be swung thereby, are one or more arms 54, connected to a shift frame 55, which carries the series of idle pinions 28, and at the rotation of the subtraction cam 42, will carry the idle pinions 28 backward into mesh with the gears 27, the idle pinions 28 being always in mesh with the racks 26. This happens at the beginning of the forward stroke of the general operator, so that a drive will be effected for a subtracting operation between the denominational members 16 and the computing wheels 17 before any of the denominational members 16 have been started in their forward computing movement. A spring 118 (Figs. 1 and 3) returns the rock shaft 53 to its original position when the subtraction cam 42 completes its revolution, thereby shifting the idle pinions 28 forwardly and breaking the driving connection between the racks 26 and the gears 27 on the computing wheels.

The shift from addition to subtraction is accomplished by a rock shaft 56 (Fig. 13), which carries an arm 57 arranged to engage the tail of the pawl 35, as in Fig. 17, and disengage the nose of this clutching pawl from engagement with the adding clutch disk 32. The rock shaft 56 also effects the change in drive for the tens-carrying mechanism, which will now be described.

Each computing wheel has a special starting tooth 58 (Fig. 10), which is a tens-carrying tooth, and engages once in a complete revolution, a mutilated gear 59, to shift the same within the sphere of operation of one of two series of segments 60. The segments 60 extend in two spirals around an assisting shaft 61, one series being for addition, and the other series for subtraction.

Normally, a mutilated portion of each gear 59 extends in opposition to a segment 60, but when shifted by the tens-carrying tooth, it brings a full portion of the gear into register with the segment 60, which completes the tens-carrying operation, so as to rotate a trident gear 62 through one-third of a revolution. This trident gear 62 meshes with a tens-carrying gear 63 on the computing wheel of next higher denomination, and rotates the latter forwardly or backwardly one-tenth of a revolution, according to whether an adding or a subtracting operation is taking place.

The shaft 61 may be driven in one direction or the other according to whether the operation is an adding or a subtracting operation. For this purpose, there are loosely mounted on the shaft 61 (Fig. 13), two oppositely-facing bevel gears 64 and 65, which are joined together by an idle gear 66. Either of the gears 64 or 65 may be clutched in driving relation with the shaft 61, by means of a clutch 67, which has clutch teeth on opposite ends thereof, to alternatively engage corresponding clutch teeth provided on the gears 64, 65. To shift the clutch 67 from one position to another, there is provided a shifting yoke 68 (Figs. 13 and 22) engaging in a circumferential groove in the clutch 67. The yoke 68 is secured to the rock shaft 56, to be oscillated back and forth thereby.

The rotation of the gears 64 and 65 is effected from the gear 31, which, it will be remembered, is rotated by the general operator 24 during the back-and-forth stroke of the latter. The connection is such, however, that the gears 64 and 65 will only be rotated during the return stroke of the general operator 24. For this purpose, there is provided a one-way clutch 70 (Figs. 11 and 13), which includes a ball or roller 71, normally urged by a spring 72 to project from a socket in the gear 65, to a position within a pocket 73 in the gear 31. The pocket 73 is tapering, so as to form a cam surface, which, when the gear 31 rotates in one direction, during the forward stroke of the general operator, will force the ball or roller 71 back into its socket in the head of the gear 65, so that the gear 31 will rotate idly without driving the gear 65.

During the counter-rotation of the gear 31, on the return stroke of the general operator 24, the ball or roller 71 will be forced out into the pocket 73, and be engaged by the abrupt surface thereof, so that it will form a positive driving connection between the gear 31 and the gear 65, enabling the gear 65 to be rotated during the return stroke of the general operator.

The gear 65, it will be remembered, is loosely mounted on the shaft 61, so that if the clutch 67 is in engagement therewith, it will drive the shaft 61; whereas, if the clutch 67 is in engagement with the gear 64, the gear 65 will still drive the shaft 61 through the gear 69 and the gear 64, but in the opposite direction. That is to say, when the clutch 67 is in engagement with the gear 65, the shaft 61 will be driven for an adding tens-carrying operation, but when the clutch 67 is in engagement with the gear 64, the assisting shaft 61 will be driven in the opposite direction for a subtracting carrying operation.

The rock shaft 56, which shifts the clutch 67 to determine the direction of drive of the tens-carrying assisting shaft 61, and which also rocks the arm 57 to determine whether the racks 26 will be directly engaged with the gears 27 for an adding operation, or indirectly drive the same through the idle pinions 28 for a subtracting operation, may be rocked manually, but in the present instance, provision is made whereby this rocking may be accomplished automatically.

To rock the shaft 56, and thus determine the character of computation carried on, there is provided thereon an arm 74 (Fig. 22), which is engaged and rocked by a bell crank 75. This bell crank may be operated by a subtraction-setting mechanism including a bar 76 operated by a spring 77.

Normally, the mechanism is set for addition, and the bar 76 is locked against the tension of the spring 77, in the position shown in Figs. 4 and 14, by a spring latch 78, which engages a notch 79 provided in the bar 76. The latch 78 is connected to be released or tripped when the carriage 7 comes to a subtracting computing zone, by a tappet 80 adjustably mounted on the bail 20 carried by the carriage 7. The tappet 80 is arranged, when the carriage 7 comes into a subtracting computing zone, to engage a trip 81 having a bearing surface 82 coextensive with the range of a computing zone, and, in fact, somewhat greater than the range of a computing zone, so as to maintain the tappet in engagement therewith, even after the last digit has been accumulated and written in a particular computing zone. The ends of the bearing surface 82 are beveled at 83 and 84, so as to enable the tappet 80 to approach the same in opposite directions, and cam the trip aside. The tappet 80 may be extended from the corresponding denominational selecting tappet 19, but is shown in the present instance, to be formed on the same block, there being a dog for subtraction setting, and a dog for denominational selecting, both for the same computing zone. The trip 81 is shown in the form of a bail pivotally mounted on the rod 22, and having an extension 85 connected to the latch 78, which is also pivoted on the rod 22.

It will thus be seen that when the tappet 80 engages the trip 81, the latch 78 will be disengaged from the notch 79. The spring 77, however, is not permitted to act at such time to shift the subtraction-setting mechanism, including the bar 76, because of the fact that this subtraction setting mechanism is locked by a lug 86 on the bar 76, engaging an extension of a shaft 87 which forms part of the general operator 24. That is to say, so long as the general operator remains in a stationary home position, the subtraction-setting mechanism will be locked even after the latch 78 has been released. However, when the general operator 24 is moved forward by any suitable motive means, such as the hand bell crank 88, the shaft 87 will be moved away from the lug 86, so that the spring 77 will be permitted to snap forward the bar 76, thereby rocking the bell crank 75, which in turn, through the arm 74, rocks the shaft 56.

As explained before, when the shaft 56 is rocked in this manner, it will shift the clutch 67 from its normal adding position shown in Fig. 13, to its subtracting position shown in Fig. 20. At the same time, the arm 57 will strike the tail of the adding clutch pawl 35, disengaging the same from its clutching disk 32, and permitting the spring 43 to engage the subtracting clutch pawl 41 with the subtracting clutch disk 33.

It is thus evident that whenever a subtracting zone is reached, the carriage, through the intermediary of one or more of the tappets 80, according to the number of subtraction zones desired, will determine automatically the setting of the computing mechanism for a subtracting operation.

It will be readily seen that when the general operator approaches the end of its return stroke, the shaft 87 will engage the lug 86, retension the spring 77, and permit the latch 78 to once more engage the notch 79, as soon as the carriage 7 passes on toward the next computing zone, or, at least, passes out of the subtraction zone in which the subtracting operation took place. Of course, the general operator on its return stroke restores the set pins, and returns the denominational members 16 in the usual way.

The various computing operations for the several computing zones might be all accumulated on one totalizer 18, but in the present instance, a group of totalizers is shown, so arranged that they may be brought into register with the actuating mechanism at any predetermined time, and receive the computations, whether adding or subtracting, according to any predetermined plan.

For this purpose, there is provided a series of totalizers 18, arranged in end-to-end alinement and separated one from another. These totalizers 18 are mounted on a carriage 89, which may be traversed to bring the totalizers 18 successively into engagement or register with the computing or actuating mechanism. To do this, there is provided a spring barrel 90, connected to the carriage 89 by a draw-band 91. Normally a latch 92 is urged by a spring 93, into engagement with one of a series of lugs 94 on the carriage 89.

The series of totalizers with their carriage 89 is started to the right, with the totalizers at the left of the series in register with the actuating mechanism including the racks 26 and the idle pinions 28, together with the tens-carrying mechanism. As the carriage passes to the next computing zone in which it is desired to have a new totalizer in register with the actuating mechanism, one of a series of tappets or dogs 95 adjustably mounted on a rod 96 carried by the carriage 7, comes into engagement with a pawl 97 on the latch 92, tripping the latter, and permitting the spring barrel 90 to jump the computing carriage 89 and totalizers carried thereby forward, to bring the next totalizer into register with the actuating mechanism.

The tripping of the latch 92 takes place during a fractional portion of a letter-space movement of the carriage 7, so that the latch 92 will have been returned to a position to engage the next lug 94 on the carriage 89, and stop the carriage 89 with the next computing head or totalizer 18 in register with the actuating mechanism. This occurs during the travel of the carriage, as many times as there are dogs or tappets 95 on the carriage, and at points corresponding to the predetermined periods in the travel of the carriage at which it is desired to have the change in totalizers or computing heads.

The pawl 97 is abrupt on one side, so as to enable the rocking action of the latch 92 when approached during an advancing movement of the carriage 7, but is cam-shaped or inclined on its opposite side, and capable of idle pivotal movement against the tension of a spring 98, so as to avoid unnecessary actions of the latch 92 during a return movement of the carriage 7. During the return movement of the carriage 7, an arm 99 on the rod 96 engages the computing carriage 89, and returns the same together with all of the totalizers 18, to the starting position.

Summarizing briefly the operation, the typewriter carriage 7 is started at the right of its travel, which also causes the starting of the computing carriage 89 at the right of its travel, with the initial computing head 18 in register with the actuating mechanism. The numeral keys 1 are struck to cause the writing of a number in the first computing zone or column, which, we will assume for the purpose of illustration, is an adding zone. The digits as they are written, are indexed digit by digit, by a setting up of the pins in the accordant denominational members 16.

After all of the digits have been indexed, the general operator is reciprocated by a movement of the hand crank 88, so that the adding cam 38, which is normally in action, will first shift the racks 26 to mesh with the pinions 27, and then drive these pinions amounts corresponding to the particular pins 15 set up, so as to run these numbers up in the dial or computing wheels 17.

The carriage 7 is then shifted to the next computing zone or column, and if one of the dogs or tappets 95 is in position, it will trip the latch 92, to bring a new totalizer or computing head 18 into register with the actuating mechanism. If no dog 95 is so positioned, the same totalizer will remain in register with the actuating mechanism.

We will assume for the purpose of illustration, that the next computing zone is a subtraction zone. There will, therefore, be one of the tappets 80 positioned on the bail 20 carried by the carriage 7, so as to come into engagement with the trip 81 as the carriage comes into the subtraction zone. The trip 81 will be actuated to release the latch 78 of the subtraction-setting mechanism, which, however, will not act immediately, because of the lug 86, which engages the shaft 87 of the general operator 24. The numeral keys 1 are again struck, to write and index the digits of the number to be subtracted. These digits will be set up in the usual manner digit by digit, in the nest of pins 15, so as to afford a preliminary representation of the number to be subtracted. After all of the digits have been so indexed, the hand crank 88 will be started forward.

As soon as the shaft 87 moves away from the lug 86, the spring 77 will act to snap forward the subtraction-setting mechanism including the bar 76, which will rock the lever 75, and thereby rock the shaft 56. The rocking of the shaft 56 will shift the clutch 67 from the Fig. 13 position, which is an adding position, to the Fig. 20 position, which is a subtracting position, at the same time bringing the arm 57 down into engagement with the tail of the adding clutch pawl 35, disengaging it from its notch 36 in the adding clutch disk 32. The adding shifting cam 38 will therefore be silent, but the very disconnection of the pawl 35 will permit the spring 43 to force the subtracting clutch pawl 41 into engagement with its clutching disk 33, so that the connection of the subtracting shifting cam 42 to the rotating gear 31 will be completed. Then the further advancing movement of the general operator, through the rotation of the gear 31 and the subtraction-setting cam 42, will shift the idle pinions 28 into mesh with the gears 27 on the computing wheels 17, enabling the racks 26, during the continued forward movement of the general operator 24, to rotate the computing wheels 17 in the direction to subtract the number indexed. The idle pinions 28 are returned to their normal positions at the conclusion of the revolution of the cam 42 by the spring 118.

Any tens-carrying operation which may be initiated during this forward movement, will be completed during the return stroke of the general operator, by the tens-carrying mechanism including the assisting shaft 61 and the segments 60 thereon.

During the return stroke of the general operator, the mechanism will be reset for addition, by the shaft 87 coming into engagement with the lug 86, retensioning the spring 77, and bringing the notch 79 into register with the latch 78. When the carriage 7 moves to the next computing zone or column, the tappet 80 will escape from the trip 81, permitting the latch 78 to be forced by its spring into the notch 79, locking the subtraction-setting mechanism against action.

If the next computing zone should be an adding one and lack one of the subtraction tappets 80, the mechanism will then be in a condition for normal adding operation. If the next computing zone should be a subtraction one, another tappet 80 would be in position, so as to again trip the latch 78, permitting a subtracting operation.

Variations may be resorted to within the scope of the invention, and portions of the improvements may be used without others.

Having thus described my invention, I claim—

1. The combination, with a series of computing wheels, and actuating members individual thereto; of floating pinions mounted intermediate said computing wheels and actuating members, and shiftable into position to complete a driving connection therebetween, but normally ineffective for such shift; controlling means operable to render said pinions effective for such shift; automatic means coming into play at a predetermined point in a series of computations, for operating said controlling means; and means for thereafter so shifting said pinions.

2. The combination, with a series of computing wheels, and actuating members individual thereto; of floating pinions mounted intermediate said computing wheels and actuating members, and shiftable into position to complete a driving connection therebetween, so as to enable a subtraction computation to be performed, but normally ineffective for such shift; controlling means operable to render said pinions effective for such shift; automatic means coming into play at a predetermined point in a series of computations, for operating said controlling means; means for thereafter so shifting said pinions; and automatic means for returning said pinions to interrupting position at the conclusion of the subtracting operation to break such driving connection.

3. The combination with a series of computing wheels, of a series of rack bars, one individual to each of said computing wheels for driving said computing wheels, means for shifting said rack bars into direct engagement with said computing wheels to effect an adding computation, a series of idle pinions shiftable into position to effect an indirect drive from said rack bars to said computing wheels so as to enable a subtracting computation, but normally ineffective for such shift, automatic means coming into play mechanically at a predetermined point in a series of computations to enable the shifting of said idle pinions into position to effect said indirect drive between said rack bars and said computing wheels for a subtracting operation, and means for thereafter so shifting said pinions.

4. The combination with a series of computing wheels, of a series of actuating members for driving said computing wheels, a series of idle pinions capable of completing a train of gearing from said actuating members to said computing wheels, a carriage traveling to determine different computing zones or columns, and carriage-operated means for determining the effectiveness of said idle pinions to complete the train of gearing between said actuating members and said computing wheels.

5. The combination with a series of computing wheels, of actuating mechanism for said computing wheels including a direct drive for addition and an indirect drive for subtraction, there being individual drives for each computing wheel, a carriage traveling to determine different computing zones or columns, and carriage-carried means for controlling whether the drive to said computing wheels will be direct or indirect for an adding or a subtracting computation.

6. The combination with a series of computing wheels, of a series of racks for driving said computing wheels, there being one rack for each of said computing wheels, a series of idle pinions for driving said computing wheels, there being one idle pinion for each computing wheel, a cam for shifting said racks into engagement with said computing wheels, a cam for shifting said pinions into engagement with said computing wheels, a carriage traveling to determine different computing zones, and means carried by said carriage for silencing one of said cams and bringing into play the other of said cams.

7. The combination with a series of computing wheels, of actuating mechanism for driving said computing wheels, a pair of cams controlling the character of drive of said computing wheels by said actuating mechanism, a drive shaft for said cams, clutching mechanisms, one individual to each of said cams for connecting said cams individually with said drive shaft, said clutching mechanisms being interdependent in their action, so that when one is in action, the other is silent, subtraction-setting mechanism for determining which of said clutching mechanisms shall act, a latch for said subtraction-setting mechanism, a trip for said latch, a carriage traveling to determine different computing zones, and a tappet carried by said carriage and arranged to engage said trip at a predetermined point in the travel of said carriage to disengage said latch, and bring said subtraction-setting mechanism into play, so as to render effective the clutching mechanism for the subtraction-setting mechanism.

8. The combination with a series of computing wheels, of actuating mechanism for said computing wheels arranged to selectively drive said computing wheels in one direction or the other for addition or subtraction, tens-carrying mechanism for said computing wheels, driving mechanism for said tens-carrying mechanism arranged to drive the same in one direction or the other according to addition or subtraction, and state-changing means for changing the direction of drive of said computing wheels by said actuating mechanism, and also changing the direction of drive of said tens-carrying mechanism, said state-changing means including a rock shaft, connections operated by said rock shaft for controlling the direction of drive of said computing wheels by said actuating mechanism, connections on said rock shaft for controlling the direction of drive of said tens-carrying mechanism by said driving mechanism, a bell crank for oscillating said rock shaft, a bar for actuating said bell crank, and a spring for actuating said bar.

9. The combination with a series of computing wheels, of actuating mechanism for said computing wheels arranged to selectively drive said computing wheels in one direction or the other for addition or subtraction, tens-carrying mechanism for said computing wheels, driving mechanism for said tens-carrying mechanism arranged to drive the same in one direction or the other according to addition or subtraction, state-changing means for changing the direction of drive of said computing wheels by said actuating mechanism, and also changing the direction of drive of said tens-carrying mechanism, said state-changing means including a rock shaft, connections operated by said rock shaft for controlling the direction of drive of said computing wheels by said actuating mechanism, connections on said said rock shaft for controlling the direction of drive of said tens-carrying mechanism by said driving mechanism, a bell crank for oscillating said rock shaft, a bar for actuating said bell crank, a spring for actuating said bar, a latch normally restraining said bar from actuation, and means for releasing said latch.

10. The combination with a series of computing wheels, of actuating mechanism for said computing wheels arranged to selectively drive said computing wheels in one direction or the other for addition or subtraction, tens-carrying mechanism for said computing wheels, driving mechanism for said tens-carrying mechanism arranged to drive the same in one direction or the other according to addition or subtraction, and state-changing means for changing the direction of drive of said computing wheels by said actuating mechanism, and also changing the direction of drive of said tens-carrying mechanism, said state-changing means including a rock shaft, connections operated by said rock shaft for controlling the direction of drive of said computing wheels by said actuating mechanism, connections on said rock shaft for controlling the direction of drive of said tens-carrying mechanism by said driving mechanism, a bell crank for oscillating said rock shaft, a bar for actuating said bell crank, a spring for actuating said bar, a latch normally restraining said bar from actuation, means for releasing said latch, and a general operator for driving said driving means and said actuating mechanism connected to manipulate said bar and retension said spring.

11. The combination with a series of computing wheels, of an actuating mechanism for driving said computing wheels in one direction or the other for addition or subtraction, setting mechanism for determining the direction of drive of said computing wheels by said actuating mechanism, a general operator for driving said actuating mechanism, and restraining means controlled from said general operator for preventing the action of said setting mechanism until said general operator itself has started in motion.

12. The combination with a series of computing wheels, of an actuating mechanism for driving said computing wheels in one direction or the other for addition or subtraction, setting mechanism for determining the direction of drive of said computing wheels by said actuating mechanism, a general operator for driving said actuating mechanism, means tending to operate said setting mechanism, a latch for restraining said setting mechanism, means for releasing said latch, and coöperating parts on said general operator and said setting mechanism restraining said setting mechanism from action after said latch has been released and until said general operator itself starts in motion.

13. The combination with a series of computing wheels, of an actuating mechanism for driving said computing wheels in one direction or the other for addition or subtraction, setting mechanism for determining the direction of drive of said computing wheels by said actuating mechanism, a general operator for driving said actuating mechanism, a lug on said setting mechanism, and a projection on said general operator lying in the path of said lug to prevent the action of said setting mechanism until said general operator has started in its movement.

14. The combiantion with a series of computing wheels, of a change drive for said computing wheels arranged to rotate said computing wheels in one direction or the other for addition or subtraction, denominational selecting mechanism for said computing wheels, a carriage traveling to determine different computing zones, shifting means for effecting a change in said change drive, a trip for controlling said shifting means having a bail co-extensive with the range of a computing zone as determined by said denominational selecting mechanism, and a tappet for operating both said denominational selecting mechanism and said trip.

15. The combination with a series of computing wheels, of a change drive actuating mechanism for said computing wheels, shifting mechanism for effecting a change in the drive of said actuating mechanism, tripping mechanism for said shifting mechanism including a bail having a bearing surface of a range at least equal to that of a computing zone, a carriage traveling to determine computing zones, and a tappet carried by said carriage arranged to engage said bail during the period of a computing zone and to maintain said tripping mechanism in its actuated position.

16. The combination with a series of computing heads, each having a series of computing wheels, of actuating mechanism having a capacity equal to a single computing head and all the wheels thereof, whereby all the digits of a number may be simultaneously run up into a single computing head, a carriage traveling to determine different computing zones and arranged to effect a relative traveling movement between said actuating mechanism and said computing wheels, so as to bring said computing heads individually within the range of said actuating mechanism, said actuating mechanism having a change drive so as to drive said computing wheels in one direction or the other, and automatic means controlled from said carriage for simultaneously jumping a new computing head into the range of said actuating mechanism and changing the direction of drive of said actuating mechanism.

17. The combination with a plurality of computing heads, each of said computing heads having a series of computing wheels, of actuating mechanism for said computing heads having a capacity equal to a single computing head and all of the wheels thereof, whereby all of the digits of a number may be simultaneously run up into a single computing head, said actuating mechanism having a change drive so as to rotate the wheels of a computing head in one direction or the other according to addition or subtraction, shifting mechanism for controlling said change drive, a carriage traveling to determine different computing zones or columns, means for jumping said computing heads so as to shift one of said computing heads out of the range of said actuating mechanism and another computing head into the range of said actuating mechanism, and tappets carried by said carriage operable to simultaneously actuate said jumping means and said shifting mechanism, thereby to simultaneously jump said computing heads and change the direction of drive of said actuating mechanism, so that succeeding computing heads may be driven in different directions by said actuating mechanism to carry on different types of computation.

18. The combination with a series of computing heads, arranged in groups of actuating mechanism having a capacity of a single group, so as to drive all the computing wheels of a single group at one and the same time, a carriage traveling step by step to control denominational selections of said actuating mechanism for a single group, means for jumping said computing wheels a distance aggregating a number of step-by-step movements, to bring different groups within the range of said actuating mechanism, means for changing the direction of drive of said computing wheels by said actuating mechanism, and controlling mechanism carried by said carriage for concomitantly effecting a change in the group of computing wheels within the range of said actuating mechanism, and a change in the direction of drive of the computing wheels by said actuating mechanism.

19. The combination, with a series of computing wheels, and actuating mechanism therefor; of a pair of cams for controlling the character of computation effected by said computing wheels by said actuating mechanism; a carriage traveling to determine different computing zones; and means carried by said carriage for silencing one cam and bringing the other into play, when the carriage reaches a predetermined zone.

20. The combination, with a series of computing wheels, and actuating mechanism therefor; of a pair of cams for controlling the character of computation effected by said computing wheels by said actuating mechanism; a carriage traveling to determine different computing zones; a drive shaft whereon said cams are loosely mounted; clutching mechanisms, one individual to each cam, for connecting said cams individually with said shaft, said clutching mechanisms being interdependent in their action, so that when one is effective, the other is ineffective; and means carried by said carriage for automatically rendering one of said clutching mechanisms effective when the carriage reaches a predetermined zone.

21. The combination, with a series of computing wheels, and actuating mechanism therefor; of a pair of cams for controlling the character of computation effected by said computing wheels by said actuating mechanism; a carriage traveling to determine different computing zones; a drive shaft whereon said cams are loosely mounted; clutching mechanisms, one individual to each cam, for connecting said cams individually with said shaft, said clutching mechanisms being interdependent in their action, so that when one is effective, the other is ineffective; subtraction-setting mechanism for rendering one of said clutching mechanisms effective; and means carried by said carriage for controlling said setting mechanism.

22. The combination, with a series of computing wheels, and actuating mechanism therefor; of a pair of companion elements associated with said actuating mechanism for controlling the character of computation effected by the latter by said computing wheels; a carriage traveling to determine different computing zones; mechanism for rendering one of said elements effective and the other ineffective; and means dependent upon the travel of said carriage for actuating the last-named mechanism.

23. The combination, with a series of computing wheels, and actuating mechanism therefor; of a pair of companion elements associated with said actuating mechanism for controlling the character of computation effected by the latter by said computing wheels; a carriage traveling to determine different computing zones; mechanism for rendering one of said elements effective and the other ineffective; a latch controlling the last-named mechanism; and a member carried by said carriage for automatically releasing said latch when said carriage reaches a predetermined zone.

24. In a combined typewriting and computing machine, the combination with a traveling carriage for determining different computing zones and a series of computing wheels, of actuating mechanism for selectively driving said computing wheels in one direction or the other for addition or subtraction, a carriage controlled setting mechanism for determining the direction of drive of said computing wheels by said actuating mechanism, a general operator for driving said actuating mechanism and coöperating parts on said general operator and said setting mechanism restraining said setting mechanism from action until said general operator has started in its movement.

25. In a combined typewriting and computing machine, the combination with a traveling carriage and a series of computing wheels; of actuating mechanism for selectively driving said computing wheels in one direction or the other for addition or subtraction; carriage controlled setting mechanism for determining the direction of drive of said computing wheels by said actuating mechanism; said setting mechanism including an operating bar, and means tending to actuate the same; a general operator for driving said actuating mechanism; a latch normally restraining said bar; means for releasing said latch; and means to prevent the action of said bar after said latch has been released and until said general operator itself starts in motion.

26. The combination, with a series of computing wheels; of actuating mechanism for selectively driving said computing wheels in one direction or the other for addition or subtraction; and state-changing means for changing the direction of drive of said computing wheels by said actuating mechanism, said state-changing means including a rock shaft, connections operated by said rock shaft for controlling the direction of drive of said computing wheels by said actuating mechanism, a bell crank for oscillating said rock shaft, a bar for actuating said bell crank, means tending to actuate said bar, a latch normally restraining said bar, and means for releasing said latch.

27. The combination, with a series of computing wheels; of actuating members individual to said computing wheels; idle pinions floatingly mounted between said actuating members and said computing wheels and shiftable into position to complete a driving connection between said actuating members and said computing wheels, but normally ineffective for such shift; controlling means operable to render said pinions effective for such shift; a carriage traveling to determine different computing zones; automatic means coming into play when the carriage reaches a predetermined zone for operating said controlling means, and means for thereafter so shifting said idle pinions.

BURNHAM C. STICKNEY.

Witnesses:
W. O. WESTPHAL,
JULIUS DUCKSTINE.